Aug. 9, 1949.    R. H. DEAL    2,478,809
HEATING ELEMENT SUPPORT UNIT
FOR OVENS AND THE LIKE
Filed March 29, 1948

INVENTOR.
Robert H. Deal
BY
[signature] Attorney.

Patented Aug. 9, 1949

2,478,809

UNITED STATES PATENT OFFICE 2,478,809

HEATING ELEMENT SUPPORT UNIT FOR OVENS AND THE LIKE

Robert H. Deal, Albion, Mich.

Application March 29, 1948, Serial No. 17,685

3 Claims. (Cl. 219—19)

This invention relates to improvements in heating element support unit for ovens and the like.

The main objects of the invention are:

First, to provide a heating element support unit for ovens and the like which is highly efficient in supporting the heating element, and one which permits very rapid assembly of the heating element and supports therefor, and one in which the number of reaches or the length of heating element can be varied when assembled to meet various capacity requirements.

Second, to provide a heating element supporting unit which may be economically produced and at the same time is highly effective in supporting a heating element.

Third, to provide a unit of the class described which minimizes labor and permits the assembly of the heating element with the support by unskilled persons and without the aid of tools.

Further objects relating to details and economies of the invention will appear from the description to follow. The invention is defined in the claims.

A structure embodying the features of my invention is illustrated in the accompanying drawing, in which.

The embodiment of the invention illustrated and described is an oven heating unit and comprises a border frame designated generally by the numeral 1 and having opposed side members 2. This frame is formed of heavy wire or light rod. A plurality of cross members 3 are provided, these being arranged in parallel spaced relation and extending between the side members, their ends being welded thereto as shown at 4. These cross members are preferably formed of flat wire springable stock.

Figure 1:
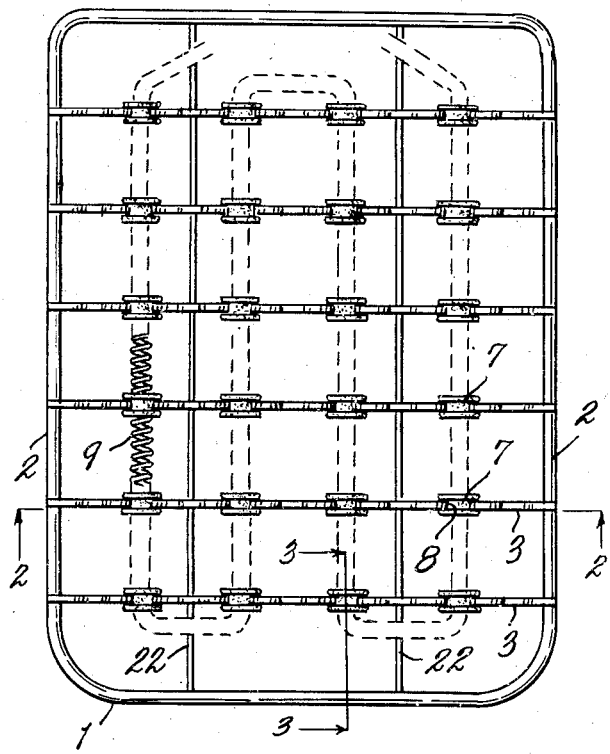
Fig. 1 is a plan view of a heating unit for ovens or the like embodying my invention, the heating element being mainly shown or indicated conventionally by dotted lines.
Figure 3:
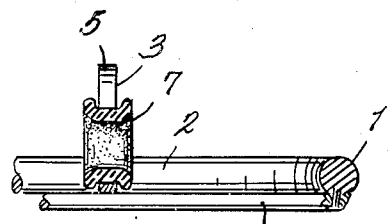
Fig. 3 is an enlarged fragmentary view in section on line 3—3 of Fig. 1.
Figure 2:
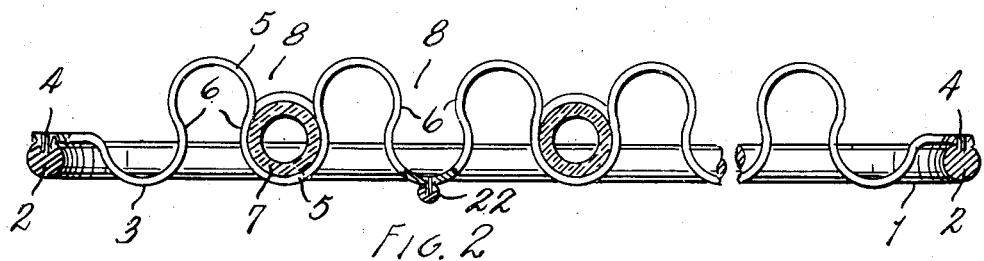
Fig. 2 is an enlarged fragmentary view partially in section on line corresponding to line 2—2 of Fig. 1.

In the preferred embodiment shown in Figs. 1, 2 and 3, the cross members are conformed into corrugation-like loops to provide a series of integral oppositely facing loops or clip members 5 having outwardly converging arms 6. The bights of the loops are curved and constitute springable connecting reaches for the adjacent arms of adjacent loops facing in the same direction. These loops constitute clips adapted to receive insulators 7, the curved sinuous bends in the stock providing outwardly expanding throats 8 which facilitate the assembling of the insulators merely by pushing them into the loops which constitute a series of oppositely facing clips. The insulators are springably retained by the arms of these loop-like clips. The bight portions, which are alternated, permit springing of the arms of the clips even when formed of quite heavy gauge stock. The insulators may be assembled without the aid of tools.

In assembling, a plurality of the insulators are threaded upon the heating element 9, that illustrated being of the helical coil type, the insulators being successively engaged with the corresponding clips of the several cross members. In the assembly illustrated, only every other clip facing in the same direction is utilized. However, selected clips may be utilized according to the length of heating element it is desired to install in the unit.

Figure 4:
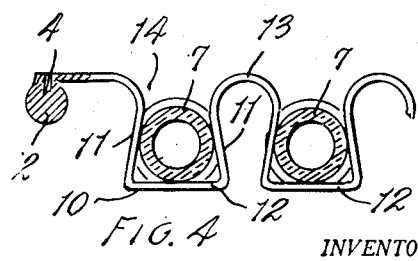
Fig. 4 is a fragmentary view partially in section corresponding to that of Fig. 2, illustrating a modified form or embodiment of my invention.

In the modified form of my invention shown in Fig. 4 the clips designated at 10 are offset in one direction and open or face in the opposite direction. The arms 11 of these clips are preferably straight, the bights 12 also being straight. The converging arms 11 being springable, the insulators 7 engaged in the clips are urged downwardly against the bights of the clips. The adjacent arms of adjacent clips are connected by curved reaches 13 which coact to provide outwardly expanding throats 14, facilitating engagement of the insulators with the clips and also permit springing of the arms so that the clips may be readily inserted therein.

In all of these embodiments the insulator may be assembled with the clips or supports without the aid of tools, and this may be done by unskilled persons or workmen. There is no likelihood of parts being broken in such assembly as is the case where support members are provided with clips or holders which require bending to clamp or secure the insulators.

In all of these embodiments there is a minimum of welding required in assembling the parts. One or more supporting rods or bars 22 are provided for the cross members which, owing to their corrugated configuration as shown in Figs. 2 and and 4, do not resist vertical stresses as efficiently as would be the case where there are fewer bends or loops in the support member.

I have illustrated and described my invention in highly practical embodiments thereof. I have not attempted to illustrate or describe certain embodiments or adaptations which I contemplate as it is believed this disclosure will enable those skilled in the art to embody or adapt my invention as may be desired.

Having thus described my invention, what I claim as new and desire to secure by Letters Patent is:

1. A heating unit of the class described comprising, a border frame having opposed side members, a plurality of cross members disposed in spaced parallel relation with their ends fixedly secured to said side members, said cross members being of springable material and conformed to provide a series of integral alternately facing loops having outwardly converging sides and constituting insulator clips, the bights of the loops being curved and constituting springable connecting reaches for the adjacent arms of loops facing in the same direction, the arms of the loops converging outwardly to springably receive and retain insulator elements arranged therein.

2. A heating unit of the class described comprising, an insulator support member of springable material conformed to provide a series of integral alternately facing loops having outwardly converging sides and constituting insulator clips, the bights of the loops being curved and constituting springable connecting reaches for the adjacent arms of loops facing in the same direction, the arms of the loops converging outwardly to springably receive and retain insulator elements arranged therein.

3. A heating unit of the class described comprising, a border frame, and a plurality of cross members of springable material disposed in parallel spaced relation and having their ends fixedly secured to the side members, each of said cross members having integral U-shaped offsets formed therein and constituting insulator element clips, the clips having outwardly converging arms adapted to receive insulator elements between them and springably retain the same, the reaches between adjacent arms of adjacent clips being curved to facilitate springing thereof.

ROBERT H. DEAL.

REFERENCES CITED

The following references are of record in the file of this patent:

UNITED STATES PATENTS

| Number | Name | Date |
|---|---|---|
| 1,048,192 | McMillan | Dec. 24, 1912 |
| 2,316,222 | Butters | Apr. 13, 1943 |
| 2,397,291 | Robertson | Mar. 26, 1946 |